(12) United States Patent
Howard et al.

(10) Patent No.: US 9,080,922 B2
(45) Date of Patent: *Jul. 14, 2015

(54) SYSTEMS AND METHODS FOR DETECTING AND COMMUNICATING MOISTURE LEAKS IN FLUID CONDUITS

(71) Applicants: Joseph J. Howard, Gilford, NH (US); Mark A. Hess, Cincinnati, OH (US); Benjamin Glace, Londonderry, NH (US)

(72) Inventors: Joseph J. Howard, Gilford, NH (US); Mark A. Hess, Cincinnati, OH (US); Benjamin Glace, Londonderry, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/291,408

(22) Filed: May 30, 2014

(65) Prior Publication Data
US 2014/0260555 A1 Sep. 18, 2014

Related U.S. Application Data

(63) Continuation of application No. 13/353,149, filed on Jan. 18, 2012, now Pat. No. 8,746,041.

(51) Int. Cl.
*G01M 3/04* (2006.01)
*G01M 3/02* (2006.01)
*G01M 3/18* (2006.01)

(52) U.S. Cl.
CPC .............. *G01M 3/04* (2013.01); *G01M 3/022* (2013.01); *G01M 3/18* (2013.01); *F16L 2201/30* (2013.01)

(58) Field of Classification Search
CPC ........... G01M 3/04; G01M 3/16; G01M 3/18; G01M 3/058; G01M 3/083; G01M 3/085; G01M 3/182; G01M 3/183

USPC .................................................. 73/40.5 R, 46
See application file for complete search history.

(56) References Cited

U.S. PATENT DOCUMENTS

| | | | |
|---|---|---|---|
| 3,485,085 A | 12/1969 | Hawkins, Jr. | |
| 3,789,297 A | 1/1974 | Frolich | |
| 5,090,871 A | 2/1992 | Story et al. | |
| 5,969,618 A | 10/1999 | Redmond | |
| 6,484,564 B1 | 11/2002 | Hayashida | |
| 6,592,126 B2 | 7/2003 | Davis | |
| 6,608,490 B1 | 8/2003 | Tombini | |
| 6,978,659 B2 | 12/2005 | Phillips et al. | |
| 7,316,154 B1 * | 1/2008 | Bennett ............................. | 73/52 |
| 7,942,452 B2 | 5/2011 | Carns et al. | |
| 8,289,173 B2 | 10/2012 | Ben-Mansour et al. | |
| 8,515,687 B2 | 8/2013 | Pereira et al. | |
| 2005/0138990 A1 | 6/2005 | Phillips et al. | |
| 2005/0268699 A1 | 12/2005 | Papakostas et al. | |
| 2006/0007008 A1 | 1/2006 | Kates | |

(Continued)

*Primary Examiner* — Peter Macchiarolo
*Assistant Examiner* — Alexander Mercado
(74) *Attorney, Agent, or Firm* — Lando & Anastasi LLP

(57) ABSTRACT

A system for detecting and communicating moisture leaking from a fluid conduit of the type comprising a fitting configured to mate with the fluid conduit, the fitting including an outer surface including an outer edge portion that is enclosed within the fluid conduit when positioning the fluid conduit over at least a portion of the outer surface, wherein the system includes a sensor for detecting moisture, the sensor being positioned proximate to the outer edge portion of the fitting and configured to generate a signal representing a result of moisture detection, and a receiver configured to receive the signal generated by the sensor. The system may include a communication circuit to provide wired or wireless communication between the sensor and the receiver. Other systems and method for detecting and communicating moisture leakage are further disclosed herein.

17 Claims, 10 Drawing Sheets

(56) References Cited

U.S. PATENT DOCUMENTS

| | | |
|---|---|---|
| 2006/0196252 A1 | 9/2006 | Deckard |
| 2007/0006638 A1 | 1/2007 | Lim et al. |
| 2008/0016950 A1 | 1/2008 | Kubala |
| 2008/0129043 A1 | 6/2008 | Holt et al. |
| 2010/0201118 A1 | 8/2010 | Anton et al. |
| 2011/0199220 A1 | 8/2011 | McAlister |
| 2011/0205072 A1 | 8/2011 | Ben-Mansour et al. |
| 2012/0167669 A1 | 7/2012 | Raghavendra et al. |
| 2013/0180318 A1 | 7/2013 | Howard et al. |

\* cited by examiner

SYSTEMS AND METHODS FOR DETECTING AND COMMUNICATING MOISTURE LEAKS IN FLUID CONDUITS

CROSS-REFERENCE TO RELATED APPLICATION

This application is a continuation of U.S. patent application Ser. No. 13/353,149 entitled "SYSTEMS AND METHODS FOR DETECTING AND COMMUNICATING MOISTURE LEAKS IN FLUID CONDUITS," filed on Jan. 18, 2012, which is herein incorporated by reference in its entirety.

BACKGROUND

1. Field of the Disclosure

The present disclosure relates generally to fittings for fluid conduit systems. More specifically, embodiments of this disclosure relate to systems and methods for detection of leaks from fluid conduits.

2. Description of Background

Fluid containers or conduits are used to store and transport various types of fluids. Detection of leakage from a fluid conduit is important in many industries, especially when the fluid being contained is a sterile fluid, or when the fluid is toxic or combustible, thereby being a safety hazard, or if the fluid is an expensive or scarce resource, such as medical materials. In particular, there is a need for monitoring and detection of moisture leaking from a conduit without necessarily having to physically or visually inspect the conduit.

SUMMARY OF DISCLOSURE

Aspects and embodiments are directed to providing a fitting and sensor for fluid leakage detection from a fluid container or conduit. Aspects and embodiments are also directed to providing features to wirelessly communicate a result of leakage detection. The term leakage as disclosed herein is not limited to external leakage and may also refer to an internal leakage, fluid buildup or pooling within a fluid transfer system incorporating fittings.

An aspect of the present disclosure is directed to a system for detecting moisture leaking from a fluid conduit of the type comprising a fitting configured to mate with the fluid conduit. The fitting includes an outer surface including an outer edge portion that is enclosed within the fluid conduit when positioning the fluid conduit over at least a portion of the outer surface.

In one embodiment, the system comprises a sensor for detecting moisture. The sensor is positioned proximate to an outer edge portion of the fitting and configured to generate a signal representing a result of moisture detection. The system further comprises a receiver configured to receive the signal generated by the sensor. In some embodiments, the outer surface of the fitting may be barbed. In some embodiments, the receiver may further include a visual and/or audio alarm. The receiver may be configured to trigger the alarm upon receiving from the sensor a signal indicating the detection of a leak.

Embodiments of the system may include a communication circuit configured to connect the sensor to the receiver. The communication circuit may be partially disposed on the outer surface of the fitting. The outer surface of the fitting may include a channel extending along a length of the fitting. The channel may be configured to retain the communication circuit. The communication circuit may be configured to wirelessly communicate the result of moisture detection from the sensor to the receiver. In some embodiments, the communication circuit may be a radio frequency identification device (RFID). The communication circuit may include a battery. In some embodiments, the communication circuit may be an integrated circuit wrapped around the outer surface of the fitting. The communication circuit may include a battery wrapped around the outer surface of the fitting. The communication circuit may be configured to wirelessly communicate the result of moisture detection over a wireless range. The system may comprise a repeater placed within the wireless range of the communication circuit. The repeater may be coupled wirelessly to the communication circuit and configured to increase the wireless range. In some embodiments, the communication circuit may be a cellular communication device. In one example, the communication circuit may be configured to communicate according to the Global System for Mobile Communications (GSM) standard.

In embodiments of the system, the sensor may comprise a capillary paper layer made of a capillary material, and at least two conductive traces disposed on the capillary paper layer. The conductive traces may be made of conductive ink printed on the capillary paper layer. The sensor may further comprise a substrate layer attached to the capillary paper layer to provide a protective backing. The substrate layer may be made of plastic. The sensor may further comprise an internal layer made of a non-conductive adhesive material to bond the capillary paper layer to the substrate layer. An adhesive layer made of a non-conductive adhesive material may be used to bond the sensor to the fitting. The non-conductive adhesive material may be a pressure-sensitive adhesive. In some embodiments, the sensor may further comprise a plurality of conductive trace protrusions extending from at least two conductive traces and disposed on the capillary paper layer to increase the sensitivity of moisture detection. The sensor may be wrapped around the outer edge portion of the fitting. The sensor may include two conductive traces extending along a length of the sensor and at least one conductive trace prong extending from each of the conductive traces towards the outer edge portion of the fitting.

In another embodiment, the system may comprise means for detecting moisture, which is positioned proximate to the outer edge portion of the fitting and configured to generate a result of moisture detection. The system further comprises means for receiving the result generated by the means for detecting moisture. Embodiments of the system may further comprise means for communicating the result from the means for detecting moisture to the means for receiving the result. The means for communicating may be partially disposed on the outer surface of the fitting. The means for communicating may embody a communication circuit configured to wirelessly communicate the result of moisture detection. In some embodiments, the communication circuit may be an RFID. The communication circuit may further include a battery.

Another aspect of the disclosure is directed to a method for detecting moisture leaking from a fluid conduit of the type comprising a fitting configured to mate with the fluid conduit. The fitting includes an outer surface including an outer edge portion that is enclosed within the fluid conduit when positioning the fluid conduit over at least a portion of the outer surface. In one embodiment, the method comprises: detecting moisture with a sensor positioned proximate to the outer edge portion of the fitting and generating a signal representing a result of moisture detection; and receiving the signal generated by the sensor with a receiver. Embodiments of the method for detecting moisture may include communicating the signal from the sensor to the receiver. Communicating the signal from the sensor to the receiver may occur wirelessly.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the disclosure. In the figures, each identical or nearly identical component that is illustrated in various figures is represented by a like numeral. For purposes of clarity, not every component may be labeled in every figure. In the figures.

DETAILED DESCRIPTION

Figure 1:
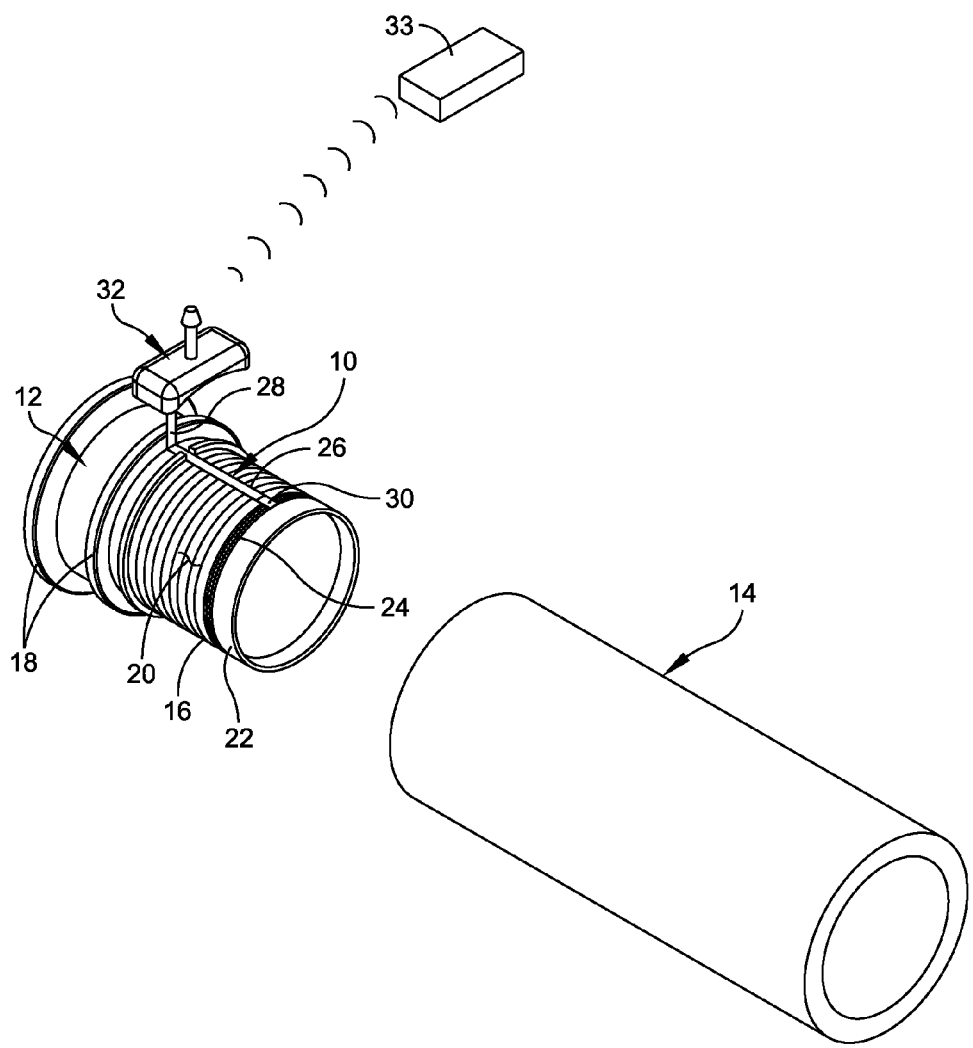
FIG. 1 is a perspective view of an exemplary embodiment of a barbed fitting including a sensor system connected to a radio frequency identification device.

Aspects of the disclosure are directed to systems and methods for detecting and communicating moisture leakage within a fluid transfer system incorporating fittings. The fluid transfer system may include a conduit connected to the fitting for transporting a liquid. The fitting may be configured to seal the fluid conduit to prevent spilling. The fitting may be configured to mate with the fluid conduit such that at least a portion of the outer surface of the fitting is enclosed within the conduit. The outer surface of the fitting may further include an outer edge portion that is enclosed within the conduit when positioning the conduit over at least a portion of the outer surface. The outer surface of the fitting may be barbed. Embodiments of the disclosure may include a sensor system for detecting moisture leaking from the conduit at the interface between the conduit and the fitting. In one embodiment, a sensor of the sensor system may be placed adjacent to the outer edge portion of the fitting to detect leakage and generate a signal indicative of the result of moisture detection. In one example, the sensor may be wrapped around an outer edge portion of the cylindrical fitting to detect moisture leakage from any direction. Furthermore, the sensor system may further be configured to seal an interface between the fitting and the fluid conduit. Embodiments of the sensor system may include a gasket or a feature that encapsulates the sensor to seal an interface between the fitting and the fluid conduit. Embodiments of the sensor system may include a receiver configured to receive the signal representing the result of moisture detection. Embodiments may include a communication circuit that links the sensor to the receiver. The communication circuit may be an integrated circuit positioned on the outer surface of the fitting. The communication circuit may be a flex circuit. The communication circuit may be configured to provide wireless connectivity of the results of moisture detection. In one example, the communication circuit may be an RFID. A repeater may be included in the communication circuit of the system to increase the wireless range of the system.

In one embodiment, the system includes a sensor that includes a capillary paper layer and a plurality of conductive traces disposed on the capillary paper. In one example, the sensor is wrapped around the outer edge portion of a cylindrical fitting, and includes two conductive traces that extend along the circumference of the fitting. The conductive traces may be configured to be parallel to each other. The sensor may include a protective substrate layer, and an internal layer of non-conductive adhesive material to attach the capillary paper layer to the substrate layer. An adhesive layer may also be used to bond the sensor to the fitting. In some embodiments, the sensor may include at least two conductive traces that extend along a length of the sensor, and at least two conductive trace prongs, each conductive trace prong extending from a conductive trace towards the outer edge of the fitting that will be covered by a portion of the fluid conduit. In some embodiments, the sensor may be manufactured as a flex circuit having a flexible substrate layer, wherein the flex circuit further includes the conductive traces.

In one embodiment, the system may further include a failsafe feature. For example, the failsafe feature may be a capacitor or a known resistive material placed on the sensor. A failsafe feature may be configured to sense a resistance of the sensor, thereby generating a resistance measurement indicating a status of the sensor. The status of the sensor may indicate that the sensor is active and functional.

Another aspect of the system is directed to methods for detecting moisture leakage from a fluid conduit. In one embodiment, the method includes detecting moisture with a sensor positioned proximate to the outer edge portion of the fitting, generating a signal representing a result of moisture detection, and receiving the signal generated by the sensor with a receiver. In one example, the method for detecting moisture may include wirelessly communicating the signal from the sensor to the receiver.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiment.

Also, the phraseology and terminology used herein is for the purpose of description and should not be regarded as limiting. Any references to embodiments or elements or acts of the systems and methods herein referred to in the singular may also embrace embodiments including a plurality of these elements, and any references in plural to any embodiment or element or act herein may also embrace embodiments including only a single element. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Turning now to the drawings, and more particularly to FIG. 1, there is shown an example of a sensor system according to aspects of the disclosure. A sensor of the sensor system is generally indicated at 10. The sensor 10 may be mounted on a fitting and used to detect moisture leakage from a connection formed between the fitting and a fluid conduit. In FIG. 1, the fitting is generally indicated at 12 and the fluid conduit is generally indicted at 14. The fitting 12 includes a cylindrical body 16, which may include a plurality of flanges 18. The body 16 of the fitting 12 includes an outer surface 20, which may be barbed, as shown in FIG. 1. Furthermore, the outer surface 20 includes an outer edge portion 22 that is provided at one end of the body 16. As the fitting 12 connects to the conduit 14, at least the outer edge portion 22 is covered by the conduit. In one embodiment, the conduit 14 is press fit on to the body 16 of the fitting 12 to create a substantially airtight and watertight seal.

The sensor 10 is flexible and may be bent to wrap around a circumference of the body 16 of the fitting 12. In one embodiment shown in FIG. 1, the sensor 10 includes a wrapped portion 24 positioned on the outer edge portion 22 of the fitting 12, such that the wrapped portion 24 forms a loop that extends along the circumference of the body 16 of the fitting 12. The sensor 10 may include an extended portion 26, which is shown to span a length of the outer surface 20 of the fitting in a direction from the edge portion 22 of the body 16 to the opposite end of the body toward flanges 18. In order to receive the extended portion 26 along the outer surface 20 of the body 16, the fitting 12 further includes a channel 30. The channel 30 is configured to retain or otherwise seat the extended portion 26 of the sensor. In one example, the extended portion 26 is oriented substantially perpendicular to the wrapped portion 24 of the sensor 10. The purpose of the channel 30 is to prevent the sensor 10 from interfering with the connection of the conduit 14 and the fitting 12.

Still referring to FIG. 1, the flexible sensor 10 may include a bent portion 28 configured to extend from the extended portion 26 away from the outer surface 20 of the body 16 of the fitting 12. In one example, the bent portion 28 may be substantially perpendicular to the extended portion 26. The bent portion 28 may, for example, provide connectivity to a communication device in the sensor system. In FIG. 1, the communication device is an RFID device, which is generally indicated at 32. The RFID device 32 may be positioned external to the fitting 12 and fluid conduit 14. The RFID device may be passive or active, and may include a battery (not shown in FIG. 1). The system also includes a receiver 33, which may be an RFID reader. In one example, the receiver may be a cellular phone including a phone application or app in which the phone app enables the cellular phone to function as a reader for the passive RFID device. In some embodiments, the receiver may be a second RFID device of another embodiment made according to aspects disclosed herein. A plurality of embodiments of sensor systems disclosed herein may form a mesh network, thereby acting as receivers at close intervals.

In some embodiments, the communication device may be a cellular communication device configured to communicate according to a cellular communication standard. In one example, the communication device may be configured to communicate according to the Global System for Mobile Communications (GSM) standard. Furthermore, the receiver may be a cellular phone.

In one embodiment according to aspects disclosed herein, a sensor system may include a sensor for detecting moisture and a receiver directly connected to the sensor to receive a result of moisture detection. The receiver may include a visual and/or audio alarm, and may be configured to trigger the alarm upon receiving from the sensor a signal indicating the detection of a leak. As mentioned above, the term leakage as disclosed herein is not limited to external leakage and may also refer to an internal leakage, fluid buildup or pooling within a fluid transfer system incorporating fittings.

Figure 2:
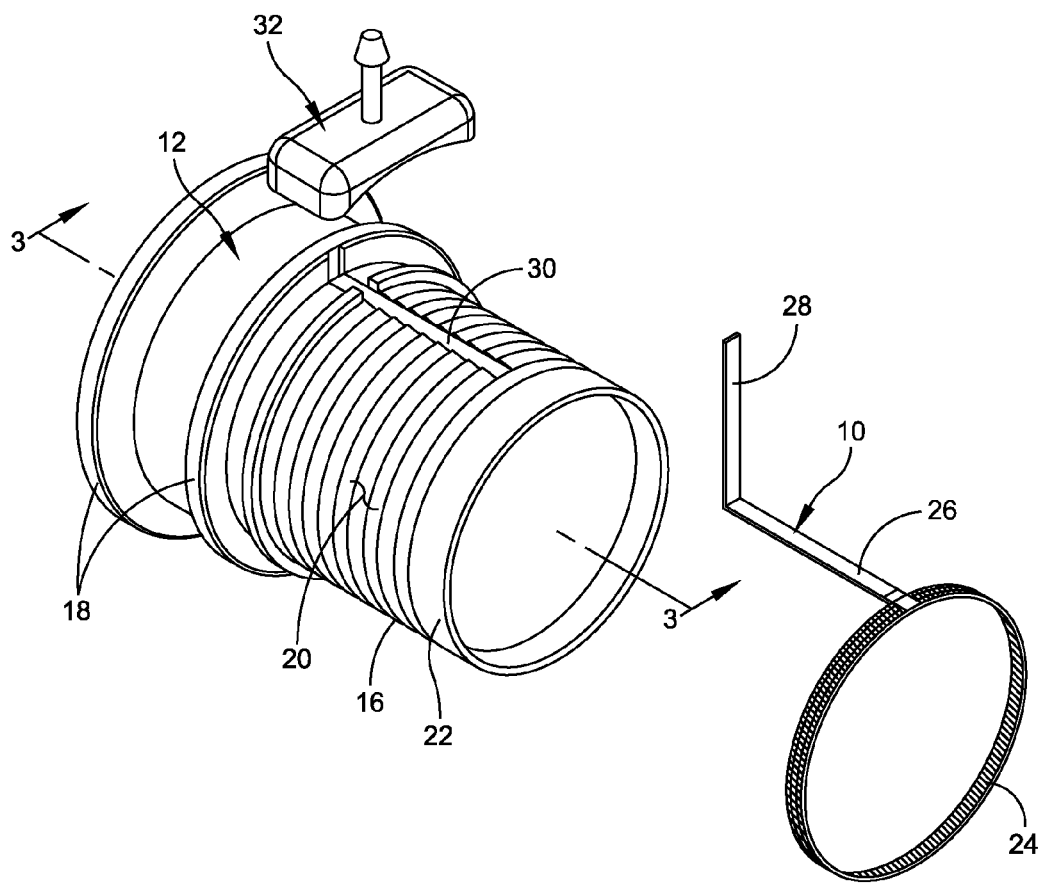
FIG. 2 is an exploded perspective view of the embodiment shown in FIG. 1, further illustrating the sensor system, and a channel formed on an outer surface of the fitting to retain a portion of the sensor system according to aspects of the present disclosure.

FIG. 2 shows the embodiment of the sensor system shown in FIG. 1 in an exploded view, further illustrating the sensor 10 and the RFID 32. Also shown is the channel 30 formed on the outer surface 20 of the barbed body 16 of the fitting 12 to retain the extended portion 26 of the sensor 10. Portions 26 and 28 of the sensor 10 provide connectivity of the sensor 10 to the RFID 32. In one embodiment, the flexible sensor 10 may be manufactured in an unwrapped state having a straight form. For example, the length of an unwrapped flexible sensor in straight form may be about 6.8 inches. The straight form of the sensor may include a 45 degree bend line to facilitate wrapping a portion of the sensor into a loop to form the wrapped portion 24 of the sensor 10 about the circumference of the body 16 of the fitting 12. In another example, the wrapped portion 24 may be about 4.7 inches in length in its unwrapped state with the extended portion 26 spanning a length of the outer surface of the fitting as shown in FIG. 2, which may be about 2.2 inches in length. In some embodiments, the sensor may comprise a plurality of parts, the parts being assembled to form the sensor. In one example, the sensor may be formed from two parts. Assembling the sensor from the plurality of parts may allow for easier manufacturing.

Figure 3:
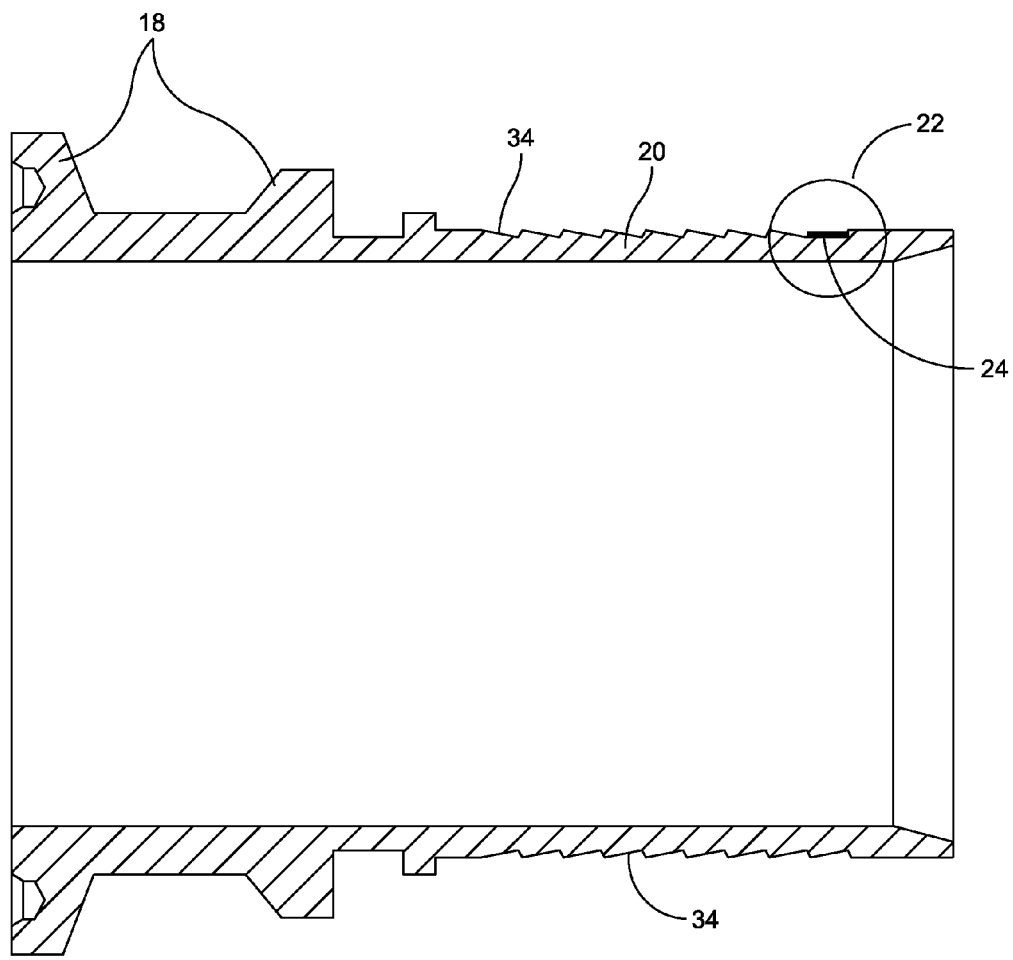
FIG. 3 is a cross-sectional view taken along line 3-3 in FIG. 2.

FIG. 3 shows a cross section of the body 16 of the fitting 12 along the 3-3 line in FIG. 2. The cross section of the outer surface 20 is shown to include a plurality of barbs, each indicated at 34. A cross section of the outer edge portion 22 is circled in FIG. 3. This outer edge portion 22 includes the wrapped portion 24 of the sensor 10. In one example, the body 16 also includes two flanges, each indicated at 18, as shown in FIG. 3.

Figure 4:
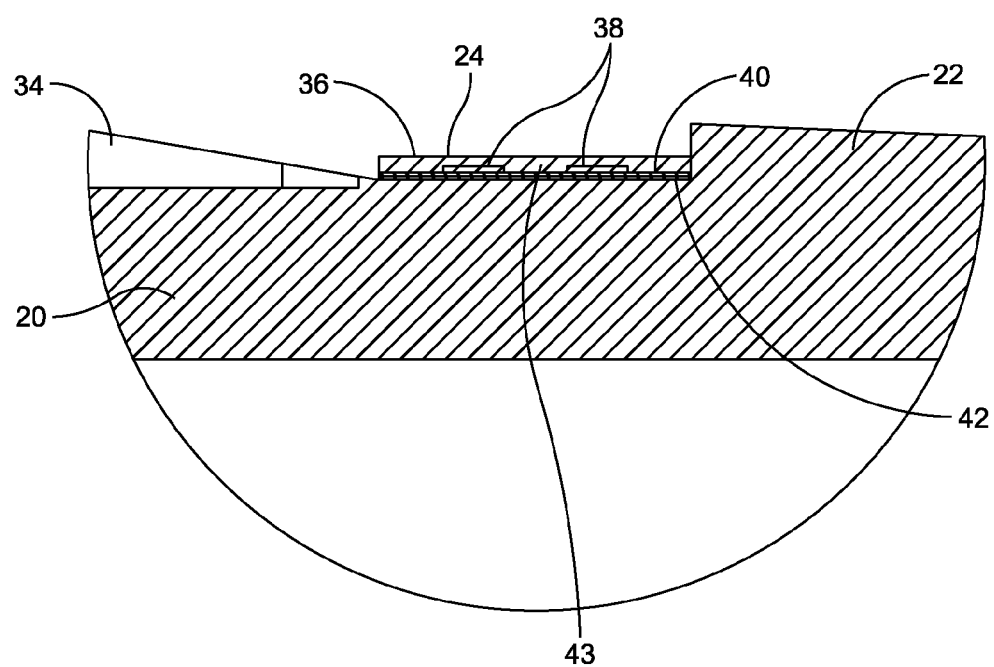
FIG. 4 is a cross-sectional view of an exemplary embodiment of a sensor system according to aspects of the present disclosure, illustrating a capillary paper layer, two conductive traces, a plastic substrate and pressure sensitive adhesive bonding of the sensor system to a fitting.

FIG. 4 is a more detailed cross-sectional view of the outer edge portion 22 as indicated by the circle illustrated in FIG. 3. The cross section shows the wrapped portion 24 of the sensor positioned on the outer surface 20, and more particularly on the outer edge portion 22 of the fitting 12. The outer surface 20 of the fitting 12 includes the barbs 34. The sensor 10 is shown to include a capillary paper layer 36, two conductive ink traces, each indicated at 38, a substrate 40, and a pressure sensitive adhesive layer 42. In one embodiment, the conductive traces 38 are printed on the capillary paper layer 36 and separated by a gap 43. As moisture leaks from the conduit 14 and reaches the gap 43 between the conductive traces 38, a signal representing the result of moisture detection propagates along the conductive traces to a communication circuit (not shown in FIG. 4), such as the RFID 32 shown in FIG. 1. The substrate 40 provides a protective backing for the capillary paper layer 36. In a certain embodiment, the substrate 40 may be made from any suitable plastic material. The adhesive layer 42 bonds the sensor 10 to the outer surface 20 of the body 16 of the fitting 12. The adhesive layer 42 may be made of a non conductive, adhesive material.

Figure 5:
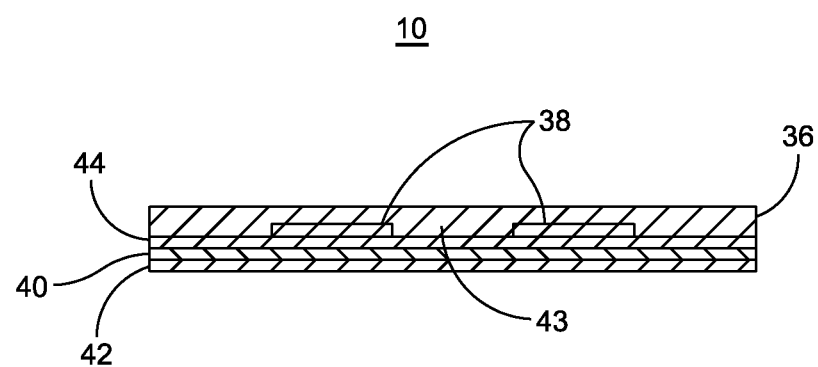
FIG. 5 is a cross-sectional view of an exemplary embodiment of a sensor system illustrating two conductive traces printed on a capillary paper layer, a plastic substrate backing the capillary paper layer, an internal layer of non-conductive adhesive between the capillary paper layer and the substrate layer and an adhesive layer for externally bonding the sensor system.

FIG. 5 shows another exemplary embodiment of a sensor 10 illustrating multiple layers of the sensor, including two conductive traces 38 printed on a capillary paper layer 36, the plastic substrate layer 40 backing the capillary paper layer, an internal adhesive layer 44 made of a non-conductive adhesive that bonds the capillary paper layer 36 to the substrate layer 40, and a non-conductive adhesive layer 42 for externally bonding the sensor. In one example, the capillary layer 36 has a width of about 0.1 inches and each conductive trace 38 has a width of about 0.02 inches. A gap between the two conductive traces may be about 0.02 inches. The thicknesses of the layers of the sensor 10 are dependent on the chosen materials and may also depend on the manufacturing process. In one embodiment, the thickness of the capillary paper layer 36 may be about 0.005 inches, the thickness of the plastic substrate 40 may be about 0.002 inches, and the thickness of the internal adhesive layer 44 between the plastic substrate 40 and the capillary layer 36 may be about 0.002 inches. In another example, the sensor 10 having several layers, including the capillary layer 36, printed traces 38, the plastic substrate layer 40 and the two adhesive layers 42 and 44, may be configured such that each of the capillary paper layer 36 and the plastic substrate layer 40 has a thickness of about 0.001 inches, and each of the adhesive layers 42 and 44 has a thickness of about 0.0005 inches.

Figure 6:
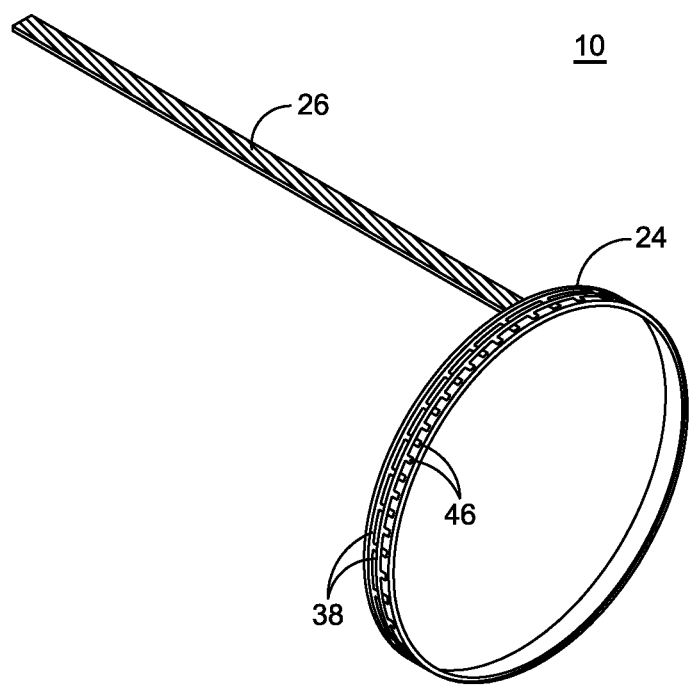
FIG. 6 is a perspective view of one example of a flexible sensor including a plurality of conductive trace prongs according to aspects of the present disclosure.

FIG. 6 shows a perspective view of another embodiment of the flexible sensor 10 including the wrapped portion 24 and the extended portion 26. In one example, the sensor has an unwrapped length of about 4.7 inches along the wrapped portion 24, and a length of about 2.6 inches along a straight extended portion 26 that may span a length of an outer surface of a fitting (fitting not shown in FIG. 6). The sensor 10 may include the conductive traces 38, which wrap around the body 16 of the fitting 12. Furthermore, the sensor 10 may include a plurality of conductive trace prongs 46 that protrude from each conductive trace 38.

Figure 7:
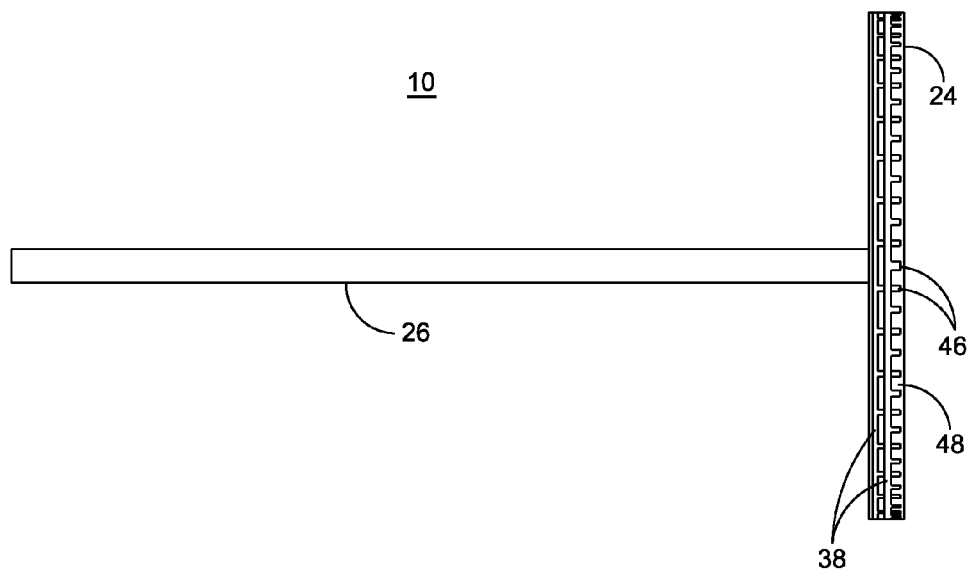
FIG. 7 is a top view of the flexible sensor shown in FIG. 6, further illustrating the plurality of conductive trace prongs forming a pattern according to aspects of the present disclosure.

FIG. 7 shows a top view of the sensor 10 shown in FIG. 6, the sensor including the extended portion 26 and the wrapped portion 24. The sensor 10 includes the two conductive traces 38 and a plurality of conductive trace prongs 46. The prongs 46 may be located on the outer edge portion 22 of fitting 12 (as shown in FIGS. 1 and 2), and have a length extending in an outward direction towards the fluid conduit 14. Each conductive trace 38 has an associated plurality of prongs 46. The prongs 46 are arranged such that adjacent prongs are alternatively connected to each of the two conductive traces 38. The prongs 46 are disposed on a dielectric layer or an insulation layer 48 to prevent bridging the two conductive traces 38 when the plurality of prongs associated a conductive trace cross another conductive trace to extend in an outward direction. As moisture reaches a gap between two adjacent prongs 46, moisture bridges the conductive traces 38, thereby generating a signal representing a result of moisture detection. By virtue of being closer to the outer edge portion 22 of the interface between the fitting 12 and the conduit 14, the prongs 46 may enhance the sensitivity of moisture detection. In one example, the length of each prong 46 may be about 0.03 inches and a width of each prong may be about 0.02 inches. Furthermore, a gap (not designated) between two adjacent prongs 46 may have a spacing of about 0.045 inches.

Figure 8:
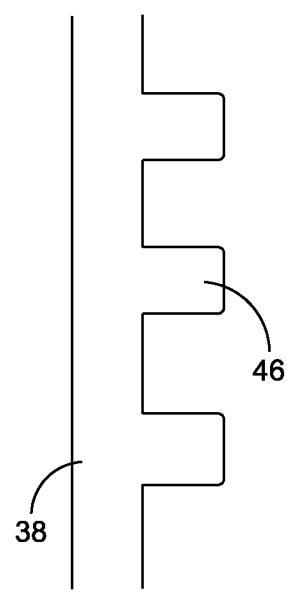
FIG. 8 is a top view of a plurality of conductive trace prongs extending from a conductive trace in FIG. 7.

FIG. 8 shows a more detailed view of a conductive trace 38 and four exemplary conductive trace prongs 46 formed along the length of the conductive trace.

Figure 9:
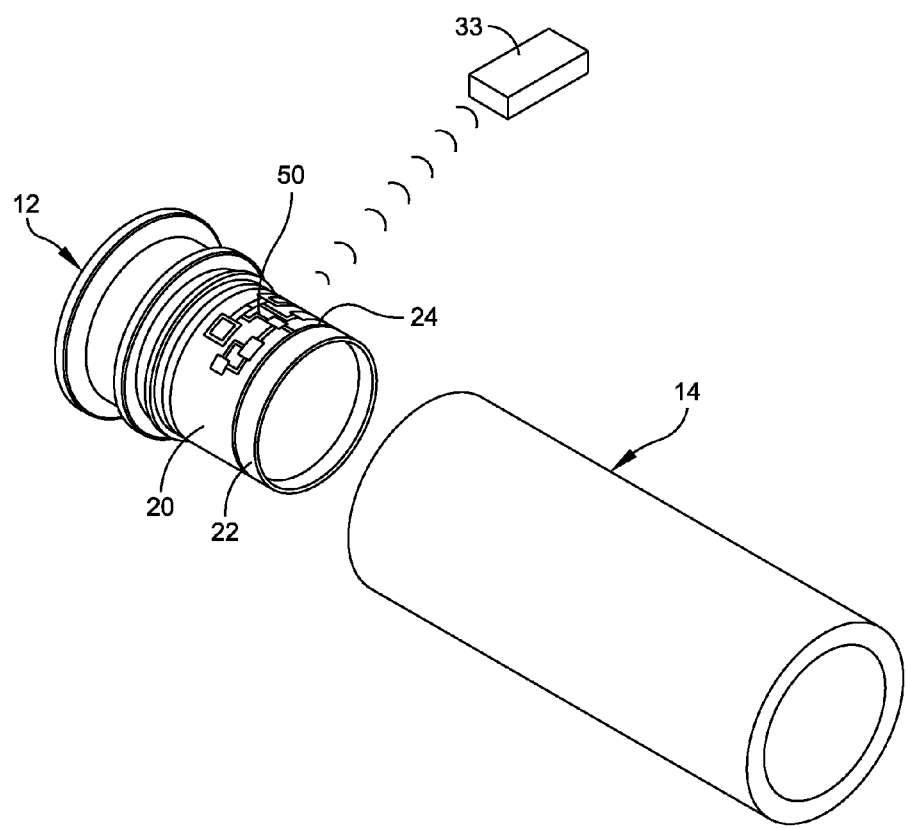
FIG. 9 is an exploded perspective view illustrating an exemplary embodiment of a fitting and a fluid conduit, the fitting including a sensor system according to aspects of the present disclosure.

Referring to FIG. 9, there is shown another example of a sensor system according to another aspect of the disclosure. The fitting 12 includes the cylindrical body 16 having the outer surface 20. The fitting 12 further includes the outer edge portion 22, and is configured to be connected to a fluid conduit 14. As shown, the outer surface 20 of the fitting 12 may be a smooth surface. The sensor 10 includes the wrapped portion 24 positioned on the outer edge portion 22 of the fitting 12, such that the sensor length extends along the circumference of the fitting. The sensor system further includes an integrated circuit 50 placed on the outer surface 20 of the fitting 12. The integrated circuit 50 may provide wireless communication of a result of moisture detection. The system may include the receiver 33 configured to receive a result of moisture detection.

Figure 10:
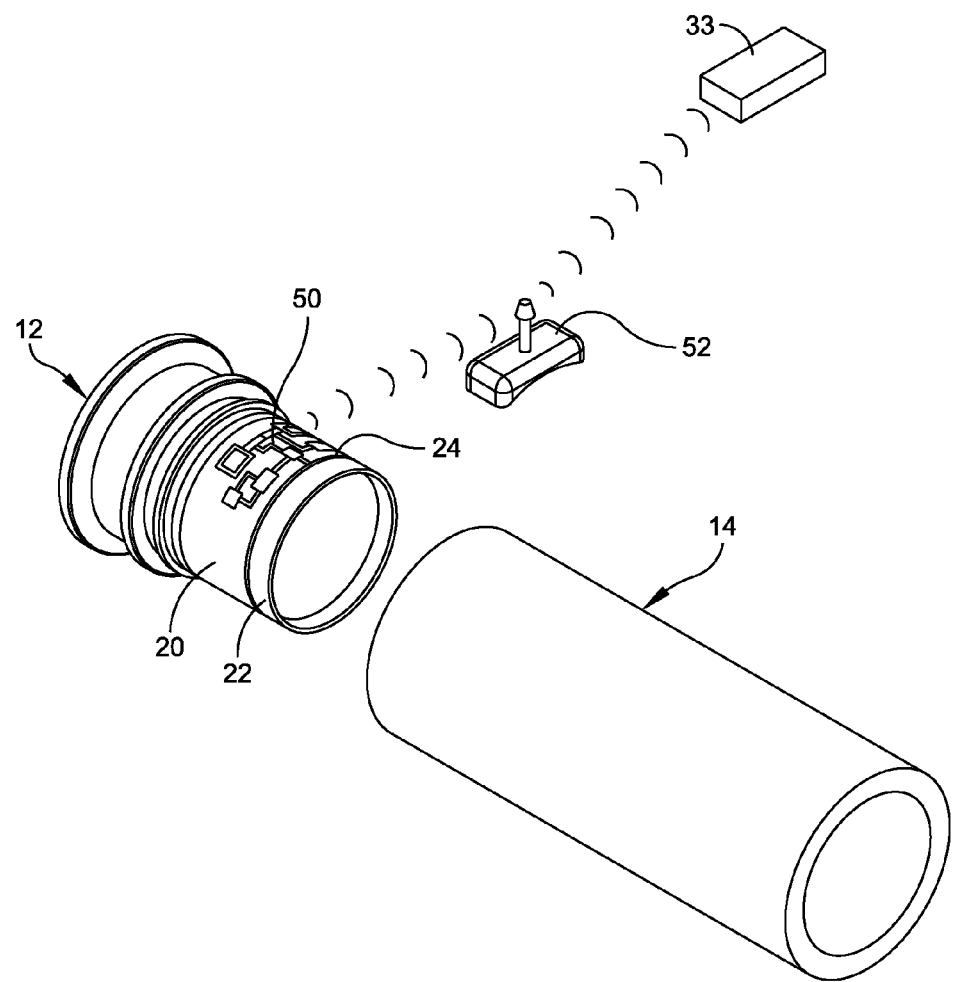
FIG. 10 is an exploded perspective view of the sensor system shown in FIG. 9, further including a repeater coupled wirelessly to the communication circuit according to aspects of the present disclosure.

FIG. 10 shows the embodiment of FIG. 9, further including a repeater 52 coupled wirelessly to the integrated circuit 50 in order to increase the wireless range over which the results of moisture detection can be communicated. The receiver 33 is included in the sensor system to receive a signal from the repeater 52, the signal being generated by the sensor 10 and sent to the wireless repeater 52 via the integrated circuit 50.

According to another aspect of the present disclosure, a method of detecting moisture leakage may be applied to a fluid conduit connected to a fitting such that an outer surface of the fitting including an outer edge portion closest to the fluid conduit is covered by the fluid conduit. In one embodiment, the method includes detecting moisture with a sensor positioned proximate to the outer edge portion of the fitting. The sensor may include a capillary layer and two conductive traces printed on the capillary layer such that the two conductive traces are separated by a gap. In another embodiment, the sensor may include a capillary layer, two conductive traces and a plurality of conductive trace prongs extending towards the fluid conduit. The method further includes generating a signal representing a result of moisture detection. In one example, as moisture from the fluid conduit reaches the gap between the two conductive traces of the sensor positioned on the outer edge portion of the fitting at the interface between the fitting and the fluid conduit, a signal representing a result of moisture detection propagates along the conductive traces of the sensor. In another example, moisture may reach a gap between two conductive trace prongs, thereby generating a signal that propagates along the conductive traces connected to the conductive trace prongs. The method further includes receiving the signal generated by the sensor with a receiver. In one embodiment, the method includes triggering an audio or visual alarm in response to receiving a signal indicating moisture leakage. In one embodiment, the method includes communicating the result of moisture detection to the receiver using an RFID tag connected to the sensor. The receiver may be an RFID reader. In another embodiment, communicating the result of moisture detection may use an integrated circuit positioned on the outer surface of the fitting to provide wireless communication from the sensor to the receiver. Communicating the result may include communicating using a cellular standard, such as the GSM standard. Receiving the signal may include receiving the signal using a cellular phone. A repeater may be used to increase the range of wireless communication.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the disclosure. Accordingly, the foregoing description and drawings are by way of example only, and the scope of the disclosure should be determined from proper construction of the appended claims, and their equivalents.

What is claimed is:

1. A system for detecting moisture leaking from a fluid conduit of the type comprising a fitting configured to mate with the fluid conduit, the fitting including an outer surface including an outer edge portion that is enclosed within the fluid conduit when positioning the fluid conduit over at least a portion of the outer surface, the system comprising:
   a sensor for detecting moisture, the sensor being positioned proximate to the outer edge portion of the fitting, the sensor including
      a wrapped portion configured to extend around a circumference of the outer surface of the fitting at the outer edge portion of the fitting,
      an extended portion extending coupled to and extended from the wrapped portion toward an end of the fitting opposite the fluid conduit, and
      an RFID device coupled to the extended portion and configured to generate a signal representing a result of moisture detection detected by the wrapped portion; and
   a receiver remote from the RFID device of the sensor, the receiver being configured to receive the signal generated by the RFID device of the sensor,
   wherein the wrapped portion has a capillary layer, two conductive traces disposed on the capillary layer, the two conductive traces extending around an entire circumference of the wrapped portion, and a substrate layer configured to bond the wrapped portion of the sensor to the outer edge portion of the fitting.

2. The system of claim 1, wherein the RFID device is disposed on the outer surface of the fitting.

3. The system of claim 1, wherein the outer surface of the fitting further includes a channel extending along a length of the fitting, the channel being configured to retain the extended portion of the sensor that connects the wrapped portion to the RFID device.

4. The system of claim 1, wherein the RFID device includes a battery.

5. The system of claim 1, wherein the outer surface of the fitting is barbed.

6. The system of claim 1, wherein the capillary layer is made of a capillary material.

7. The system of claim 6, wherein the conductive traces are made of conductive ink printed on the capillary layer.

8. The system of claim 6, wherein the substrate layer is attached to the capillary layer to provide a protective backing.

9. The system of claim 8, the sensor further comprising an internal layer made of a non-conductive adhesive material to bond the capillary layer to the substrate layer.

10. The system of claim 9, further comprising an adhesive layer made of a non-conductive adhesive material to bond the substrate layer to the fitting.

11. The system of claim 6, the sensor further comprising a plurality of conductive trace protrusions extending from said two of said conductive traces and disposed on the capillary layer to increase the sensitivity of moisture detection.

12. The system of claim 1, wherein the receiver is an RFID reader.

13. A method for detecting moisture leaking from a fluid conduit of the type comprising a fitting configured to mate with the fluid conduit, the fitting including an outer surface including an outer edge portion that is enclosed within the fluid conduit when positioning the fluid conduit over at least a portion of the outer surface, the method comprising:
   detecting moisture with a sensor positioned proximate to the outer edge portion of the fitting, the sensor including a wrapped portion configured to extend around a circumference of the outer surface of the fitting at the outer edge portion of the fitting, an extended portion extending coupled to and extended from the wrapped portion toward an end of the fitting opposite the fluid conduit, and an RFID device coupled to the extended portion and configured to generate a signal representing a result of moisture detection detected by the wrapped portion;
   generating a signal with the RFID device of the sensor, the signal representing a result of moisture detection; and
   receiving the signal generated by the sensor with a receiver,
   wherein the wrapped portion has a capillary layer, two conductive traces disposed on the capillary layer, the two conductive traces extending around an entire circumference of the wrapped portion, and a substrate layer configured to bond the wrapped portion of the sensor to the outer edge portion of the fitting.

14. The method of claim 13, further comprising positioning the RFID device on the outer surface of the fitting.

15. The method of claim 14, further comprising positioning the extended portion in a channel extending along a length of the fitting.

16. The method of claim 13, further comprising powering the RFID device with a battery.

17. The method of claim 13, wherein the receiver is an RFID reader.

* * * * *